MEANS FOR ADJUSTING THE ANGULAR RELATION BETWEEN A WORKPIECE TO BE GROUND AND A TOOL

Original Filed Jan. 16, 1970 4 Sheets-Sheet 1

INVENTOR

RALPH E. PRICE

BY David Allen

ATTORNEY

INVENTOR
RALPH E. PRICE

BY David Allen
ATTORNEY

INVENTOR
RALPH E. PRICE

BY David Allsey
ATTORNEY

INVENTOR
RALPH E. PRICE
BY David Allsey ATTORNEY

United States Patent Office

Re. 28,082
Reissued July 23, 1974

28,082

MEANS FOR ADJUSTING THE ANGULAR RELATION BETWEEN A WORKPIECE TO BE GROUND AND A TOOL

Ralph E. Price, Waynesboro, Pa., assignor to Landis Tool Company

Original No. 3,690,072, dated Sept. 12, 1972, Ser. No. 98,807, Jan. 16, 1970. Application for reissue Feb. 1, 1973, Ser. No. 328,664
Int. Cl. B24b *49/04*
U.S. Cl. 51—165 R 10 Claims

Matter enclosed in heavy brackets [ ] appears in the original patent but forms no part of this reissue specification; matter printed in italics indicates the additions made by reissue.

ABSTRACT OF THE DISCLOSURE

An automatic taper compensator is used to maintain a parallel relationship between the axis of a wide grinding wheel or multiple grinding wheels (22–26) and the centerline of a cylindrical workpiece (W) on a grinding machine. Two gage heads (43, 44) are automatically advanced during the grinding cycle at the extreme ends of the workpiece portions being ground. A differential circuit (48) directly compares the voltage output of the right hand (R.H.) and the left hand (L.H.) gage heads (43, 44) and generates a signal when the difference varies by more than a predetermined amount. Compensation is effected by deflecting the appropriate wheel spindle bearing support (41 or 41') in a forward direction, as separate force applying means (49, 49') are provided at each end of the wheel spindle (18) for that purpose.

BACKGROUND OF THE INVENTION

1. Field Of The Invention

This invention relates to an improved method and apparatus for preventing a taper from being formed on a workpiece, which is being ground on a multiple grinding wheel machine. The invention also has application on wide wheel grinding machines. In multiple or wide wheel cylindrical grinding machines, it is very important to maintain a parallel relationship between the axis of the workpiece and the axis of the grinding wheel(s). Otherwise, the workpiece can be ground with a taper, i.e., one end of the workpiece is ground oversize in relation to the other. It is desirable that adjustments be made to the relative positions of the wheel(s) and workpiece(s) during the grinding cycle in order to provide finished pieces which are ground to the same tolerance over the entire length thereof. This invention has particular application in grinding workpieces such as automotive crankshafts wherein the main bearings are ground on an automative machine having multiple wheels, spaced according to the bearings.

2. Description Of The Prior Art

Prior to this invention, gaging means were provided for measuring spaced diameters on a workpiece. Facilities were provided to stop the grinding operation if one of the diameters was ground to a low limit before the other diameter had been ground to a high limit. The taper was then corrected by adjusting a swivel table a slight amount to compensate for the measured taper. An example of this method was covered in the Pheil U.S. Pat. No. 3,097,454, granted July 16, 1963. This method is used on manual machines and would not be satisfactory for automatically-operated machines.

In the Haisch U.S. Pat. No. 3,271,910, granted Sept. 13, 1966, a parallel or a predetermined angular position between the axis of a grinding wheel spindle and the axis of the workpiece was controlled automatically. In the only operative embodiment disclosed in this patent, the headstock (or tailstock, but not both) was displaced to compensate for any resulting taper. This approach has the drawback that the movement of the headstock (or tailstock) can interfere with the work rest positioned adjacent thereto. It should also be noted that if any over-correction occurs, contact between the grinding wheel and the workpiece would be lost, since the headstock (or tailstock) then had to be retracted. This has the disadvantage of disturbing the spatial relationship between the workpiece and the wheel, causing further gaging problems.

SUMMARY OF THE INVENTION

In accordance with the invention, a multiple or wide wheel grinding machine is provided for grinding axially spaced portions of a workpiece. The machine includes a work support for supporting the workpiece and the grinding wheel support including a spindle for supporting one or more rotatably mounted grinding wheels. Means are provided to effect a relative transverse feeding movement between the wheel spindle and the workpiece support to perform a grinding operation. At least two electrical size signals are generated from spaced portions on the workpiece during the grinding cycle. The two signals are compared directly and a third signal is generated when the difference between the signals exceeds a predetermined value. The third signal actuates means for deflecting the wheel support to move the corresponding grinding wheel toward the workpiece.

In the preferred embodiment, separate and independent means are provided at spaced portions of the grinding wheel, to displace one or the other of the spindle supports in a transverse direction. In order to facilitate the deflection of the spindle supports, the supports are in the form of cantilever arms which can be deformed in a forward direction toward the workpiece.

It is, therefore, an object of the present invention to control a parallel relationship between the axis of the wheel spindle and the axis of the workpiece automatically.

Another object is to provide a control device which directly compares the voltage output from two gages to each other and generates a taper compensating signal in response thereto.

Another object is to remove all compensation from the workpiece, which enables the original setting of the headstock, tailstock, work rests, and the gage heads to be undisturbed during the complete grinding cycle.

Another object is to maintain a parallel relationship between the axis of the wheel spindle and the axis of the workpiece, without interfering with the support[of] *or* pressure from a work rest.

Another object is to provide a means for compensating for any taper automatically, without losing contact between the grinding wheel and the surface of the workpiece.

Another object is to enable any over-compensation to be corrected by effecting movement of the opposite taper compensating mechanism, without losing contact between the grinding wheel and the surface of the workpiece.

Another object is to provide means to reset the position of the grinding wheel spindle to its original parallel position at completion of each grinding cycle automatically.

DESCRIPTION OF THE PREFERRED EMBODIMENTS

Figure 1:
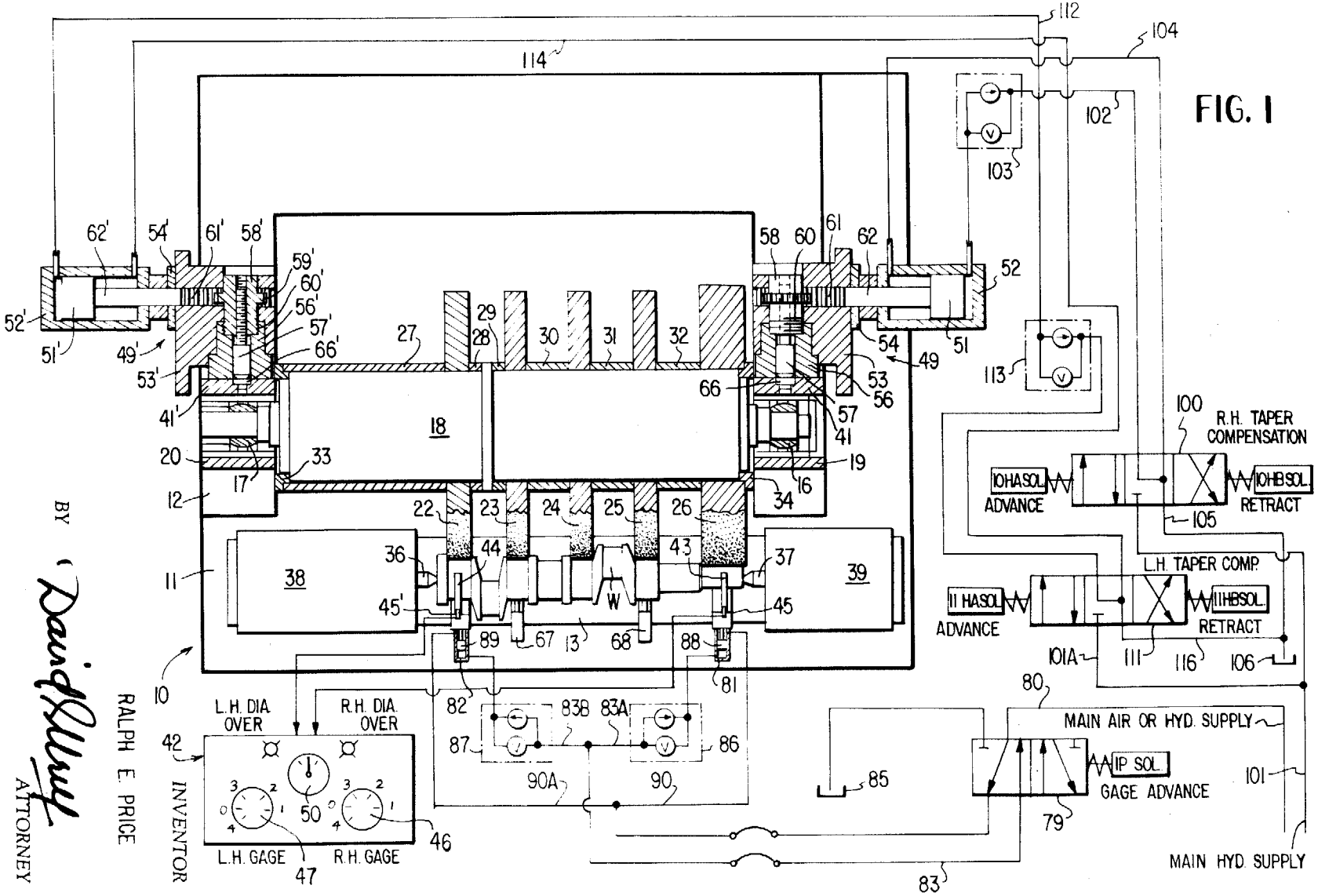
FIG. 1 is a plan view of a multiple wheel grinding machine, embodying the present invention, and showing taper compensation mechanisms for advancing either end of the grinding wheel spindle, the visual readout dials from the gage system, and the schematic diagram showing the hydraulic controls.

Referring now to the drawings, in FIG. 1, there is illustrated the plan view of a grinding machine, generally designated by the numeral 10, having a bed 11, which supports a wheel support 12 and a work support 13. The wheel support 12 carries the spindle bearings 16 and 17, which support the rotatable spindle 18. The spindle bearings are retained in a spaced relation by means of R.H. and L.H. clamps, 19 and 20, which are pivotably mounted, but secured to the front of the wheel support 12, through fasteners 21. Grinding wheels 22, 23, 24, 25, and 26 are carried in a spaced relation to correspond to the portions of the workpiece W to be ground, by means of spacers 27, 28, 29, 30, 31 and 32, which are locked in position by wheel center rings 33 and 34.

The workpiece W is rotatably supported by the headstock and tailstock work centers 36 and 37 in a conventional manner. The headstock 38 and the tailstock 39 are longitudinally positioned and locked to the work support 13, and the work support 13 is manually positioned to align the workpiece portions with the spaced grinding wheels 22–26.

Figure 2:
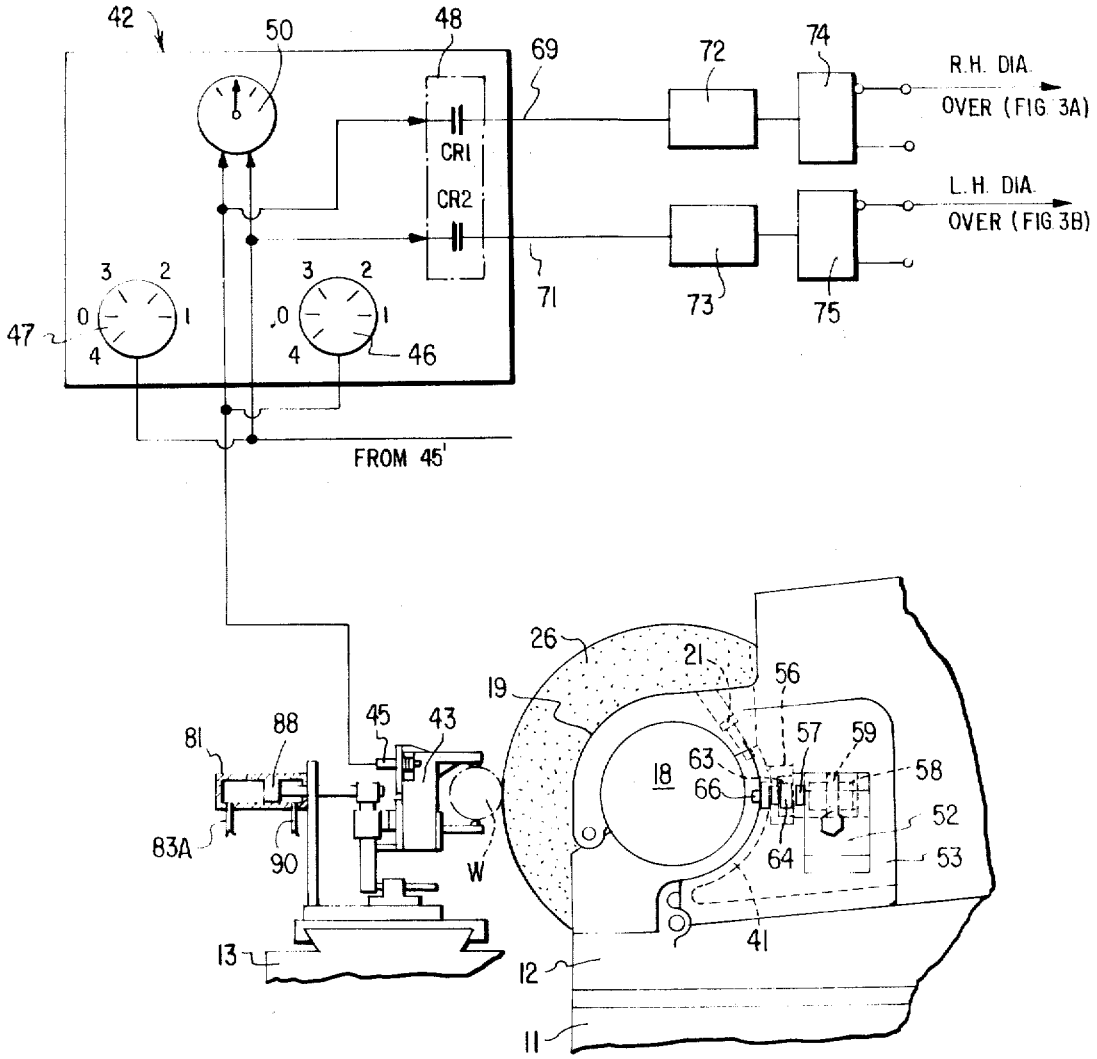
FIG. 2 is a partial R.H. end view showing the R.H. taper compensation mechanism mounted on the wheel support, and the differential circuit of the gage system.

The front portion of the wheel support 12 includes wheel spindle supports 41 and 41' which are longitudinally spaced to form the rear support for the spindle bearings 16 and 17 at the respective locations. As shown in FIG. 2, the wheel spindle support 41 is connected to the wheel support 12 at its lower end, but is unsupported at its upper end, the wheel support 41' is formed in a similar manner. The supports 41 and 41' act as cantilever arms which can be deflected to change the angular position of the wheel spindle 18 with respect to the workpiece W. The appropriate support 41 or 41' is deflected automatically during a dwell in the grinding cycle to insure a parallel relationship between the axis of the wheel spindle 18 and the axis of the workpiece W prior to reaching size.

An electronic grinding gage system 42 consists of two gage heads 43 and 44 having readout dials 46 and 47 which receive signals from conventional probe members or transducers 45 and 45' and also directs a signal to a differential comparator circuit 48, which compares all readings directly through a continuous plus or minus reading from a normal zero setting as indicated by a differential dial 50, described more fully hereinafter. (The gage system 42 is similar to the electronic gage Model 135B–79 R–1 shown in a catalogue of Federal Products Corporation, 1144 Eddy Street, Providence, R.I. 02901.) The differential comparator circuit 48 includes two oscillators (not shown) which transmit signals through linear variable differential transformers to the transducers 45 and 45'. The transducers 45 and 45' send voltage signals back to the differential comparator circuit 48, the voltages of which are a function of the position of the transducers. The signals are directly compared in the differential comparator circuit 48, and if there is a differential between the voltages which exceeds a predetermined amount, one of the two relays (not shown) within the differential comparator circuit 48, is energized. A first of the relays has a contact CR1 and a second of the relays has a contact CR2 (see FIG. 2). This circuit 48 is used to make taper corrections by advancing the respective end of the wheel spindle 18 automatically to compensate for any undesired taper between the ends of the workpiece W, when the tolerance limits are exceeded.

Each end of the spindle 18 is advanced by the movement of a taper compensator assembly 49 and 49', to compensate for the oversize diameter portion. The taper compensation assemblies 49 and 49' are secured to each side of the wheel support 12, as shown in FIG. 1.

The R.H. and L.H. taper compensating mechanisms are identical, therefore, only the R.H. assembly 49 will be described. The right hand end of the wheel spindle 18 is advanced when the diameter of the right hand end of the workpiece W exceeds the tolerance over the lft hand diameter. The forward movement is effected by movement of a piston 51, within a hydraulic cylinder 52, which *is* [s] secured to a R.H. housing 53, through an adaptor plate 54. The R.H. housing 53 houses a *bushing* [busing] 56, which supports a slidable plunger 57. The plunger 57 is in threaded engagement with a pinion nut 58. The outer teeth 59 of the pinion nut 58 are in mesh with the teeth of a rack member 61 which is secured to a piston rod 62 of the piston 51. A threaded portion 60 of the pinion nut 58 is in threaded engagement with the internal threads of the bushing 56, to provide a fine advance movement of the plunger 57, by means of differential threads.

The bushing 56 includes a vertical slot 63, as shown in FIG. 2, which enables a key 64 to be secured to the plunger 57, to prevent the plunger 57 from rotating when the pinion nut 58 is rotated. The sides of the slot 63 also provide means to limit the total amount of movement of the plunger 57 in either direction.

Movement of the piston rod 62 effects movement of the rack member 61, and the pinion nut 58 is rotated, which advances the pinion nut 58 to the left, as shown in FIG. 2. The plunger 57 is retracted to the right relative to the pinion nut 58. However, by varying the threads per inch on the nut 58 and the plunger 57, it is possible to advance the nut 58 at a faster rate than the plunger 57 retracts, thereby giving the plunger 57 an absolute advance to the left (FIG. 2) at a fine rate through differential threads. For example, the nut 58 may have 8 threads per inch, and the plunger 10 threads per inch. Therefore, the plunger 57 is advanced against a pressure post 66, that is secured to the wheel spindle support 41. Movement of the plunger 57 deflects the wheel spindle support 41 a slight amount and the R.H. bearing 16 and the R.H. end of the spindle 18 are advanced until the signals from the gage heads 43 and 44 come within the allowed tolerance as determined by the differential comparator circuit 48. The normal fine feed rate is then initiated and continues until size is reached.

It should be understood that the control means which effects the operation of the taper compensating mechanisms 49 and 49' are not actuated until after the wheel support 12 has been advanced by any of the conventional means. The gage heads 43 and 44 are not advanced to engage the workpiece diameters until the diameter of the workpiece W has been rough ground. This method is conventional and prevents the gage heads 43 and 44 from being damaged by the rough surface of an unground workpiece.

OPERATION

The grinding wheels 22–26 or a single wide wheel (not shown) are advanced by a digital feed system which effects movement of the wheel support 12 for predetermined distances and at predetermined rates, after the workpiece W has been properly positioned in alignment with the grinding wheels 22–26, and after the headstock 38 has started the rotation of the workpiece W. A feed system of this type is disclosed in co-pending application of Price et al. Ser. No. 45,829, filed on June 12, 1970, entitled "Feed Rate and Positioning Control System for a Machine Tool," assigned to Landis Tool Co., which is expressly incorporated herein.

A sequence control counter disclosed in the above patent application determines the rate of infeed, the end points, and the dwell periods during the grinding operation, by controlling the rate and the number of pulses directed to the electro-hydraulic pulse motor. The pulse motor advances the grinding wheels 22–26 transversely at preselected distances, until a size signal is obtained by means of the gage heads 43 and 44.

The grinding wheels are advanced at a rapid infeed rate, until a load control relay (not shown) is deenergized by contact between the grinding wheels 22–26 and the workpiece W. This reduces the infeed rate of the grinding wheels 22–26 to a first grinding feed rate. The work rests 67 and 68 are advanced to compensate for the resultant forces from the grinding wheels 22–26, to prevent deflection of the workpiece W in a conventional manner. The grinding feed rate continues until a dwell period is effected.

The gage heads 43 and 44 are then advanced to a position as shown in FIG. 1 in the following manner. A gage advance solenoid 1P SOL is energized which shifts a control valve 79 to the left, and fluid pressure is directed through a line 80 to the valve 79 and to the head end of the hydraulic motors or cylinders 81 and 82 through lines 83, [*83a*] *83A* and [*83b*] *83B*. Flow control valves 86 and 87 are included in the lines [*83a*] *83A* and [*83b*] *83B*, respectively, to control the operating speed of pistons 88 and 89, by throttling the pressure and by allowing free flow of the returning fluid. Fluid pressure from the lines 83, 83A, and 83B advances the pistons 88 and 89, which advance the gage heads 43 and 44, respectively, against the end portions of the workpiece W. The lines 90 and 90A direct the fluid being exhausted from the rod end of the cylinders 81 and 82 through the valve 79 and to a drain 85.

The wheel support 12 is retracted a small amount at the end of a first dwell period, until the counter is equal to the number set on the reset switches (not shown). The grinding wheels 22–26, are advanced after a second dwell period and a second feed rate is effected which continues until either of the No. 2 gage contacts on the dial 46 or 47 are tripped, to effect the third dwell period.

Taper compensation will be effected automatically during the third dwell period, by the energization of the R.H. or L.H. taper compensation solenoids 10HA SOL or 11HA SOL, respectively, if the comparator circuit 48 indicates a predetermined difference between the R.H. and the L.H. portions of the workpiece W.

In the case of right hand compensation, the contact CR1 in a line 69 (FIG. 2) is closed by energization of its associated relay (not shown) in the comparator circuit 48. A circuit is completed to a converter 72 which converts the voltage to a logic level, and through a Schmitt Trigger 74 which squares the pulse waves in a conventional manner, to provide a signal that the R.H. diameter is over the tolerance range. (Left hand compensation is similarly effected through closure of contact CR2 in a line 71 which completes a circuit through a converter 73 and a Schmitt Trigger 75.)

When the taper compensation switch SS10 is in the ON position, taper compensation will be effected to advance the R.H. end of the wheel spindle 18. This occurs when the signal from the comparator circuit 48 determines that the diameter of the R.H. portion of the workpiece W as measured by the transducer 45 of the R.H. gage head 43, exceeds the allowable tolerance over the diameter being measured by the transducer 45' of the L.H. gage head 44.

Figure 3A:
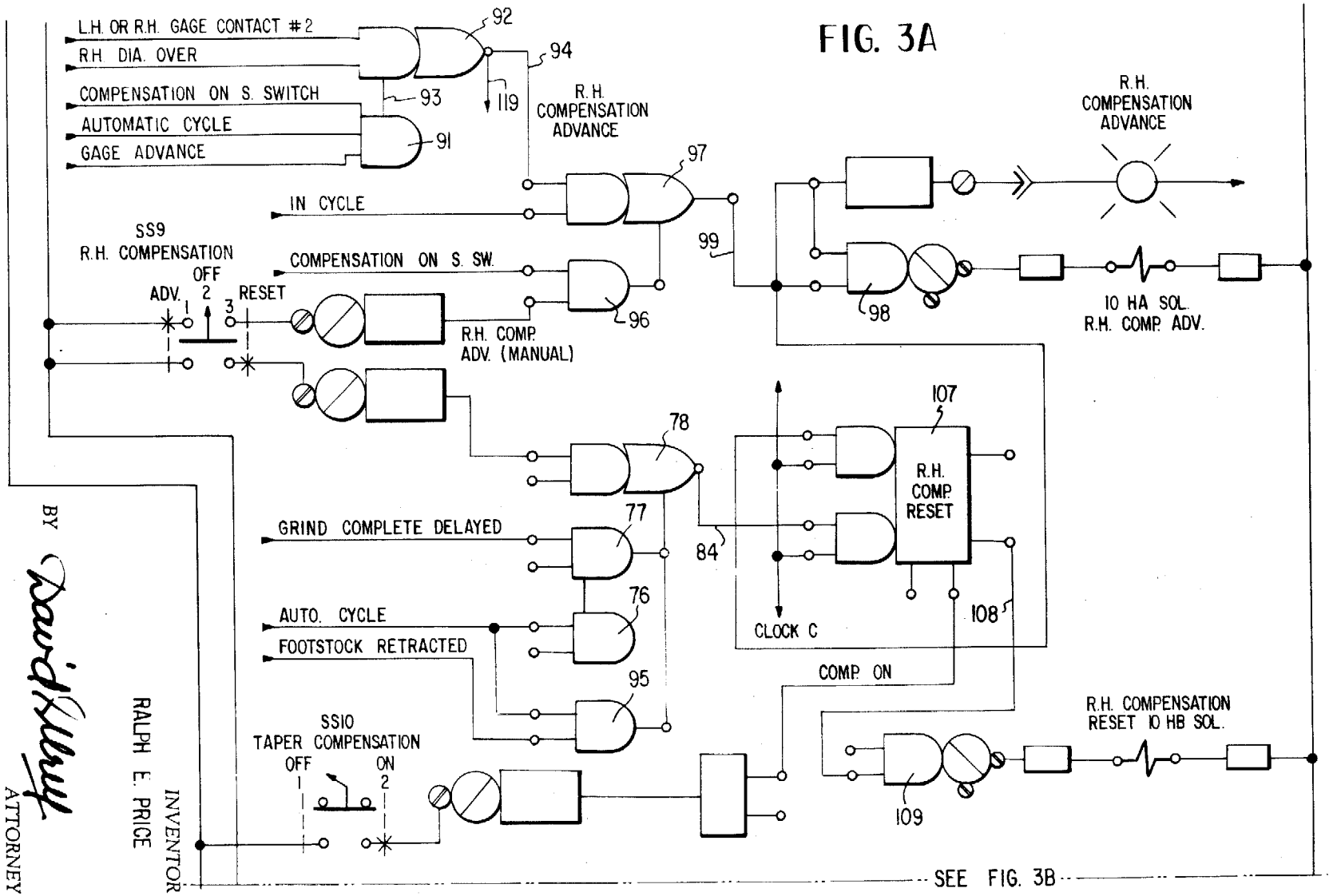
FIGS. 3A and 3B are a diagram showing the circuit logic for the taper compensation mechanisms.
Figure 3B:
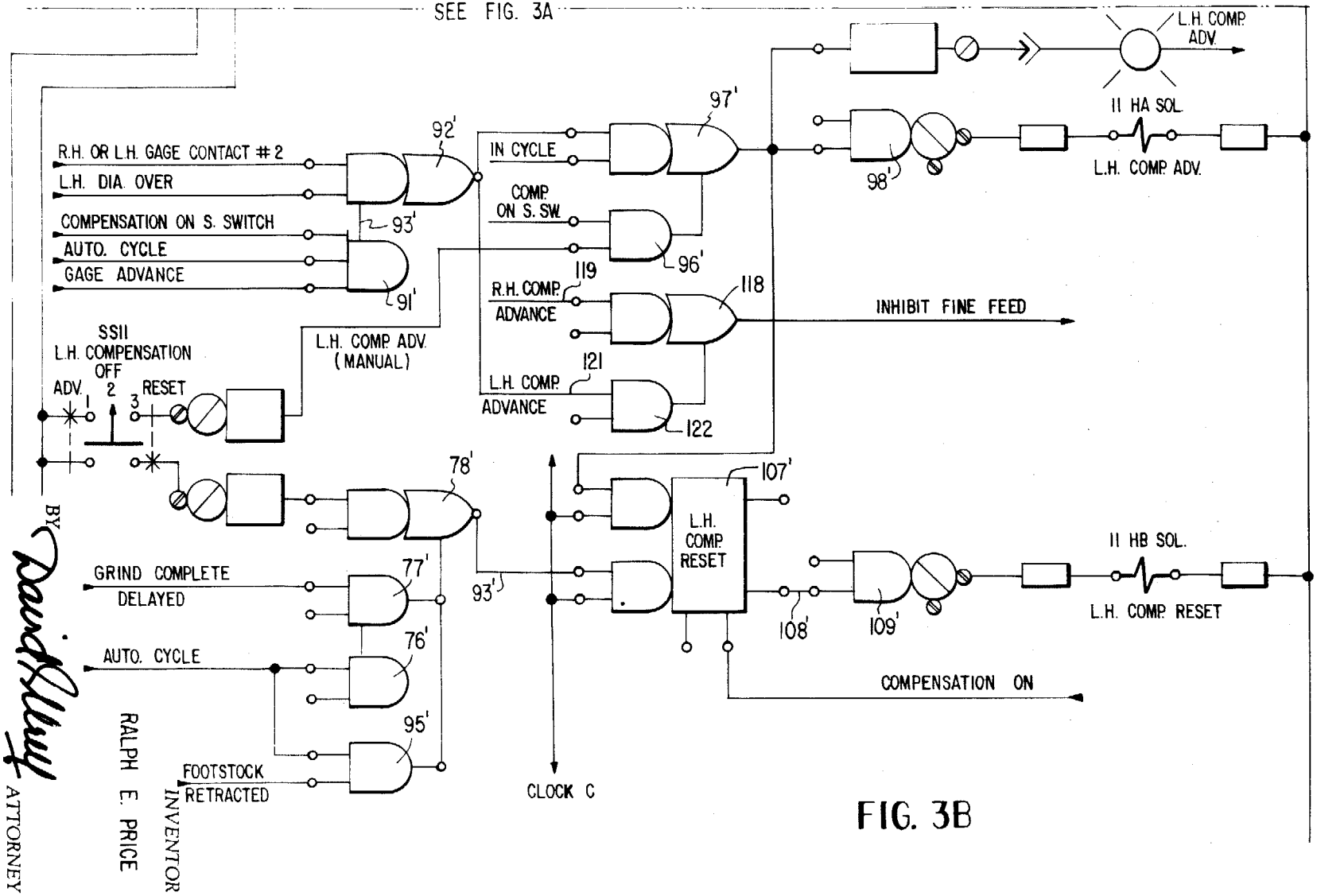

Referring to FIGS. 3A and 3B, the solenoid 10HA SOL is energized when a signal from an expander 91 is directed to an AND gate 92 through a line 93 and the AND gate 92 directs a signal to an AND gate 97 through a line 94. A signal is directed from the AND gate 97 to an output converter 98 through a line 99. The output converter 98 converts the d-c voltage signal to an a-c voltage signal and energizes the solenoid 10HA SOL, which is protected by conventional fuses (unnumbered).

The energization of the solenoid 10HA SOL shifts a control valve 100 to the right (FIG. 1). Main pressure from a hydraulic source directs hydraulic fluid from a line 101 through the valve 100, and through a line 102, which connects the valve 100 to the head end of the hydraulic cylinder 52. A flow control valve 103 is included in the line 102 to control the operating speed of the piston 51 within the cylinder 52 by throttling the fluid pressure and by allowing free flow of the returning fluid when the piston 51 is reset. The piston 51, the piston rod 62, and the rack member 61 which are in mesh with the outer teeth 59 of the pinion nut 58, are advanced. This movement effects rotation of the nut 58 which advances to the left (FIG. 2), and the plunger 57 is retracted to the right at a slower rate. Therefore, the pinion nut 58 drives the plunger 57 against the post member 66, at a fine feed rate, which deforms or deflects the wheel spindle support 41, to effect the forward movement of the R.H. end of the wheel spindle 18.

Referring now to FIG. 1, it should be understood that the line 104 directs the fluid being exhausted from the rod end of the cylinder 52 through the valve 100, and to a line 105 which is connected to a drain 106.

Movement of the plunger 57 continues, until the comparator circuit 48 determines that the signals returning from the transducers 45 and 45' are within a specified limit, as visually indicated by the differential dial 50. The contact CR1 is opened and solenoid 10HA SOL is then deenergized, whereupon the control valve 100 is returned to its normal position by spring pressure.

The fine feed rate is started at completion of the third dwell period. The grinding wheels 22–26 are advanced at a slow rate until either of the No. 3 gage contacts, as shown on the readout dials 46 and 47 (FIG. 1) are tripped. The fourth dwell period is effected and a sparkout operation is effected which continues until size is obtained. The wheel support 12 is retracted in a conventional manner when size is reached and the R.H. taper compensating assembly 49 is reset. The reset movement is effected by the energization of the solenoid 10HB SOL, which occurs when the R.H. compensation flip-flop 107 (FIG. 3A) is reset. This occurs when the line 108 directs a signal to the a-c converter 109, which converts the d-c voltage signal to an a-c voltage signal, and energizes the R.H. compensation reset solenoid 10HB SOL.

The R.H. compensation flip-flop 107 is reset when a signal from the expanders 76 and 77 are directed to the AND gate 78 which directs a signal to the flip-flop 107 through a line 84, following a delay after the grinding cycle is completed. The flip-flop 107 is also reset should the footstock 39 be retracted, as an expander 95 will provide a signal to the AND gate 78 which is connected to the flip-flop 107 through the line 84.

The energization of the solenoid 10HB SOL shifts the control valve 100 (FIG. 1) to the left, and hydraulic fluid is directed from the line 101 through the valve 100, and through the line 104, to the rod end of the cylinder 52. The piston 51 and the piston rod 62 are reset and the rack member 61 rotates the pinion nut 58 to retract the plunger 57 to the reset or original position. The axis of the wheel spindle 18 is returned to its normal free position which is parallel to the axis of the workpiece W.

It should be understood that the operation of the L.H. taper compensation assembly 49' as shown in FIG. 1, is effected in a similar manner, should the comparator circuit 48 determine that the diameter of the L.H. portion of the workpiece W, as measured by the transducer 45' of the L.H. gage head 43, exceeds the allowable tolerance over the diameter being measured by the transducer 45 of the R.H. gage head 43. The L.H. compensation advance solenoid 11HA SOL is energized, and the control valve 111 is shifted to the right. Fluid pressure is directed through the lines 101 and 101A, through the valve 111 to a line 112, which is connected to the head end of the cylinder 52'. A flow control valve 113 is included in the line 112 to control the operating speed of the piston 51' within the cylinder 52' by throtling the fluid pressure and by allowing free flow of the returning fluid when the piston 51' is reset. It should be understood that the line 114 directs the fluid being exhausted from the rod end of the cylinder 52' through the valve 111, to a line 116 which is connected to the line 105 and drain 106.

Taper compensation is then effected in the manner as previously described, ad the L.H. side of the wheel spindle support 41' is deflected to advance the L.H. end of the wheel spindle 18, until the signals returning from the transducers 45 and 45' are within specified limits. Fine feed is then started and the wheel support 12 is advanced at a fine feed rate until size is reached.

The wheel support 12 is retracted in a conventional manner following a delay after size is reached, and the L.H. compensating reset solenoid 11HB SOL is energized. The control valve 111 is shifted to the left, and hydraulic fluid from the lines 101 and 101A is directed through the valve 111 and to the rod end of the cylinder 52, through the line 114. The piston 51 is reset, and the plunger 57' is retracted to its reset position in preparation for grinding the next workpiece W.

The control circuit in FIG. 3B for L.H. taper compensation is similar to FIG. 3A for R.H. taper compensation, and like elements have been given like numerals with a prime (') designation.

It should be understood that the fine feed rate is stopped at any time, should the comparator circuit 48 determine that the difference between the R.H. and L.H. portions of the workpiece W indicates a taper. A signal is directed from the AND gate 92 to an AND gate 118 through a line 119 when a signal for R.H. compensation is generated. A signal from an AND gate 92' directs a signal through a line 121 to the expander 122 and to the AND gate 118 when a signal for L.H. compensation is generated. The R.H. or L.H. compensation is otherwise effected as previously stated.

While this invention is described in detail with reference to automatic means for maintaining a parallel relationship between the grinding wheel axis and the centerline of a cylindrical workipece W, it should be understood that the operation of the taper compensation assemblies 49 and 49' may also be manually effected or reset during a manual grinding operation by means of the R.H. compensation selector switch SS9, and by the L.H. compensation selector switch SS11, as shown in FIG. 3. Each of these switches would provide a signal to the respective AND gates 97 or 97'.

It is also to be understood that only a preferred embodiment of the invention has been specifically illustrated and described, and variations may be made thereto without departing from the invention, as defined in the appended claims.

I claim:

1. In a grinding machine for grinding axially spaced *workpiece* portions [of a workpiece], including a work support for supporting [said] *the* workpiece *for rotational displacement about the axis of the axially spaced portions thereof,* [a grinding wheel support including] a spindle for supporting a grinding apparatus including at least one rotatably mounted grinding wheel, [axially spaced spindle bearings for supporting opposite ends of said grinding wheel spindle,] *and* means for effecting a relative transverse feeding movement between [said] *the grinding* wheel spindle and [said] *the* work [support] *piece* to perform a grinding operation *on the axially spaced workpiece portions,* the improvement comprising:

[said grinding wheel support includes a cantilever arm] *first and second means* [at each end] for supporting *the opposite ends of* said *grinding wheel* spindle;

means for generating [at least] first and second electrical signals from first and second *axially* spaced positions on *the axially spaced portions of* the workpiece during the grinding cycle, said signals being representative of the dimension of the workpiece at said first and second positions;

*means for subjecting either of said first or second supporting means to a deformation force having a selected direction for deforming the corresponding spindle supporting means whereby the corresponding end of the grinding wheel spindle will be displaced towards the workpiece being ground,* means for [directly] compairing said first and second signals and *for* generating a third signal when the difference between said signals exceeds a predetermined *maximum* value; and means actuated by said third signal for [deflecting] *actuating the* one of said *subjecting means* [cantilever arms of the wheel support to move] *which will deform the one of said first and second spindle supporting means and accordingly displace* [the end of said grinding apparatus corresponding to the higher of said first and second signals] *the corresponding end of said grinding wheel spindle* towards the workpiece [to] *which will reduce said difference* [bring the grinding wheel spindle into parallelism with the workpiece].

[2. A grinding machine as recited in claim 1, wherein said deflecting means includes two separate force applying mechanisms, one at each end of the wheel support, for moving the grinding wheel spindle toward the workpiece.]

3. A grinding machine as recited in claim 1, wherein [said plungers have threads at one end, and wherein said force applying mechanisms] each *of said subjecting means* [further] comprises:

a hydraulic motor having a piston rod with a rack member formed in the end thereof, said motor being operable in response to said third signal;

*a plunger having one end operably engaged with one of said spindle supporting means and being threaded on the other end;* a pinion nut having internal threads for receiving said one end of said plunger and having external teeth in mesh with said rack member, and further having external threads adjacent [the] *said* external teeth; and means in threaded engagement with said external threads of said pinion nut, when the nut is [rotating] *rotated* by said rack member, for advancing said nut and plunger toward the *one of said* [wheel support] *spindle supporting means* at one rate while said plunger retacts on the internal threads of said pinion nut at a slower rate, so that said plunger has an absolute advance [into] *against the one of* said [wheel support] *spindle supporting means* upon the operation of said hydraulic motor.

4. In a grinding machine for grinding axially spaced *equal diametered* portions of a workpiece, including a work support for supporting [said] *the* workpiece, a spindle for supporting a grinding apparatus including at least one rotatably mounted grinding wheel, [axially spaced spindle bearings for supporting opposite ends of said grinding wheel spindle,] feeding means for effecting a relative transverse feeding movement between [said] *the* wheel spindle and [said] *the* [work support] workpiece to perform a grinding operation, *and* means for controlling [said] *the* feeding means, the improvement comprising:

a grinding wheel spindle support including [a pair of cantilever mounted arms] *first and second means* for supporting *the* opposite ends of said *grinding wheel* spindle,

*first and second,* separate and independently movable, means associated with [said cantilever arms of said grinding wheel spindle] *each of said supporting means* for *deforming said supporting means and for* advancing the [respective ends] *corresponding end* of said spindle [supports] in a *selected* transverse direction *towards the workpiece* during a grinding cycle, means for gaging the workpiece at *axially* spaced [axial] positions *on said portions* and *for* generating signals indicative of the relative size of the workpiece at said points; and means for [directly] comparing said signals and [operable in response to the gaging means] for generating [another] *a third* signal whenever the relative size of *the workpiece at said* two *axially spaced* positions varies more than a predetermined amount, said signal being effective to actuate *the one of* said [displacing] *movable* means [to] *which will* [move] *advance* the end of said spindle corresponding to the larger size*d* workpiece *position* toward the workpiece. [until the gaging means determines that the relative sizes of the two positions of the workpiece are within said predetermined amount].

5. A grinding machine as recited in claim 4, wherein *each of* said [displacing] *movable* means comprises:

a hydraulic motor having a piston rod with a rack member formed in the end thereof, said motor being operable in response to said *third* signal;

a plunger having one end associated with *one of* said *first and second* grinding wheel support*ing means* and being threaded on the other end;

a pinion nut having internal threads for receiving the threaded end of said plunger and having external teeth in mesh with said rack member, and further having external threads adjacent the external teeth; and means in threaded engagement with said external threads of said pinion nut, when the nut is rotating by said rack member, for advancing said nut and plunger toward *the one of* said *first and second* wheel support*ing means* at one rate while said plunger retracts on the internal threads of said pinion nut at a slower rate, so that said plunger has an absolute advance into said wheel support upon the operation of said hydraulic motor.

6. A grinding machine as recited in claim 4, wherein said gaging means comprises:

transducers positioned at said spaced axial positions for generating electrical voltages which are a function of the dimensions *of the workpiece* at the respective positions;

and wherein *each of* said [displacing] *movable* means further comprises,

*a spaced* [plungers] *plunger* for deflecting the end of said grinding wheel support corresponding to the higher of said electrical voltages; and means, including a hydraulic motor, for advancing [one of] said [plungers] *plunger* in response to said other signal.

7. A grinding machine as recited in claim 4, wherein, said force applying mechanisms include plungers for deflecting one of said arms upon generation of said signal.

8. In a grinding machine for grinding axially spaced portions of a workpiece including a work support for supporting said workpiece *for rotational displacement about a selected axis thereof,* a grinding wheel support including a spindle for supporting a grinding apparatus including at least one rotatably mounted grinding wheel *wherein the axis of the grinding wheel and the selected axis of the workpiece are substantially parallel,* feeding means for effecting a relative transverse feeding movement between said wheel spindle and said work support to perform a grinding operation, means for controlling said feeding means, the improvement comprising:

said grinding wheel support having axially spaced cantilevered portions extending therefrom to support said spindle;

means for gaging the workpiece at *two axially* spaced positions [thereof] and for generating at least two electrical signals indicative of the workpiece diameters at said positions[,] during the grinding cycle;

means for directly comparing said two signals and *for* generating a compensation signal whenever the signal indicates the axes of the grinding wheel spindle and workpiece are out of parallelism by more than a predetermined amount; and force applying means actuated by the generation of said compensation signal for deflecting *the* one of the cantilevered portions of said wheel support toward the workpiece *which will* [to] bring the axes of the grinding wheel spindle and the workpiece into parallelism.

*9. A grinding apparatus comprising*

*a pair of elements adapted to be rotated about parallel axes,*

*the first one of said pair of elements comprising a workpiece,*

*base means,*

*first and second means for mounting the opposing ends of said workpiece on said base means,*

*means for rotating said workpiece about the axis of at least a portion thereof,*

*the second one of said pair of elements comprising a grinding apparatus including at least one grinding wheel rotably mounted on a spindle,*

*first and second means for mounting the opposing ends of said spindle on said base means,*

*means for rotating said grinding wheel about the axis thereof,*

*means for effecting a relative transverse feeding movement between said grinding wheel spindle and said workpiece to perform a grinding operation on at least a part of said workpiece portion,*

*first and second means for respectively subjecting the first and the second mounting means of one of said pair of elements to a force having a selected direction for deforming said mounting means and accordingly displacing the corresponding end of said one element towards said other element,*

*gaging means for generating first and second signals from first and second axially spaced positions on said workpiece part, said signals being representative of the diametral dimension of said workpiece at said first and second positions,*

*means for comparing said first and second signals and when the difference between said signals exceeds a predetermined maximum difference for actuating the one of said first and second subjecting means which will effect the displacement, in said selected direction, of the one end of said one element which will result in said difference being reduced below said maximum difference.*

*10. A grinding machine according to claim 9, wherein said one element comprises said grinding apparatus.*

*11. A grinding machine according to claim 9, wherein said workpiece portion comprises a plurality of axially spaced diameters.*

References Cited

The following reference, cited by the Examiner, are of record in the patented file of this patent or the original patent.

UNITED STATES PATENTS

| | | | |
|---|---|---|---|
| 3,064,395 | 11/1962 | Price | 51—165 R |
| 3,097,454 | 7/1963 | Pheil | 51—165 R |
| 3,145,508 | 8/1964 | Price | 51—165.9 |
| 3,271,910 | 9/1966 | Haisch | 51—165 R |

FOREIGN PATENTS

| | | | |
|---|---|---|---|
| 857,971 | 1/1961 | Great Britain | 51—165 R |
| 1,213,452 | 11/1970 | Great Britain | 51—165 R |

HAROLD D. WHITEHEAD, Primary Examiner

U.S. Cl. X.R.

51—165.91